W. L. NELSON.
PEANUT DIGGER.
APPLICATION FILED JUNE 1, 1916.

1,206,893.

Patented Dec. 5, 1916.

Witnesses
James F. Crown,

Inventor
W. L. Nelson,
By
Attorney.

UNITED STATES PATENT OFFICE.

WILLIE L. NELSON, OF ICONIUM, OKLAHOMA.

PEANUT-DIGGER.

1,206,893. Specification of Letters Patent. Patented Dec. 5, 1916.

Application filed June 1, 1916. Serial No. 101,076.

*To all whom it may concern:*

Be it known that I, WILLIE L. NELSON, a citizen of the United States, residing at Iconium, in the county of Logan, State of Oklahoma, have invented certain new and useful Improvements in Peanut-Diggers; and I do hereby declare the following to be a full, clear, and exact description of the invention, such as will enable others skilled in the art to which it appertains to make and use the same.

The present invention is directed to improvements in peanut diggers, and has for its object to provide a device of this character constructed in such a manner that when drawn across the field it will dig the peanuts and separate the dirt from the vines and peanuts.

A further object of the invention is to provide a device of this character constructed in such a manner that the peanuts and vines after being dug will be deposited rearwardly of the machine together with the earth, whereby the peanuts can be conveniently gathered and cured in the usual way.

With these and other objects in view, this invention resides in the novel features of construction, formation, combination and arrangement of parts to be hereinafter more fully described, claimed and illustrated in the accompanying drawing, in which:—

Figure 1:
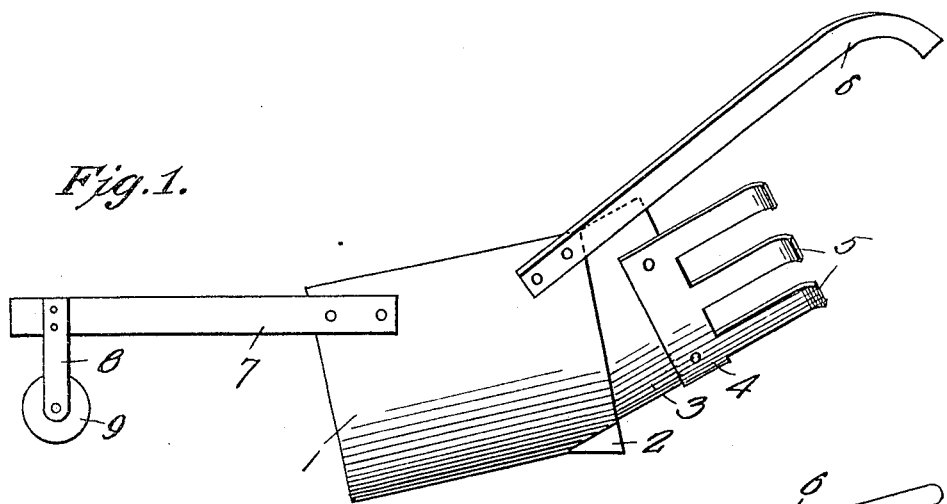
Figure 2:
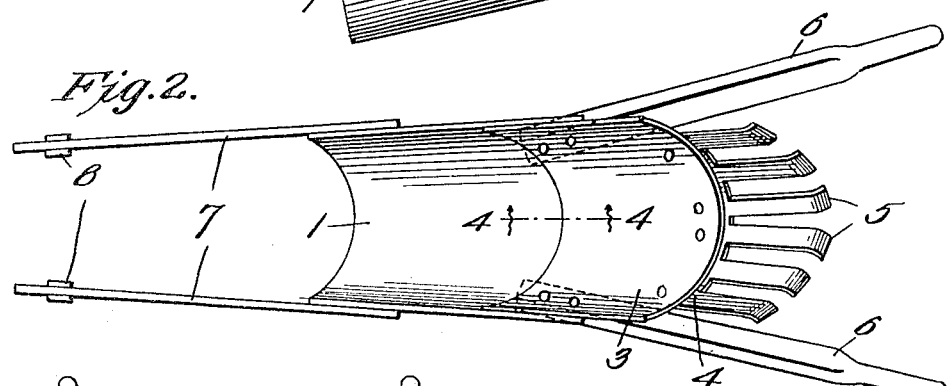
Figure 3:
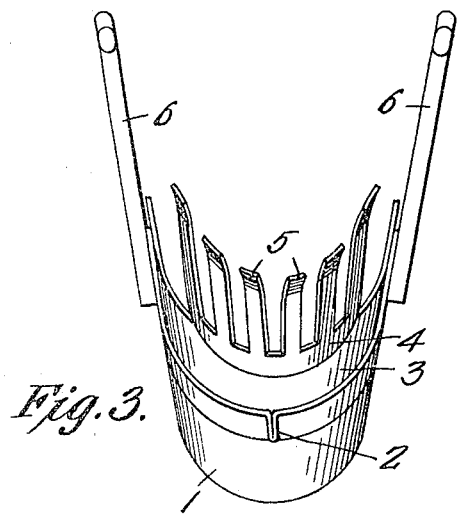
Figure 4:
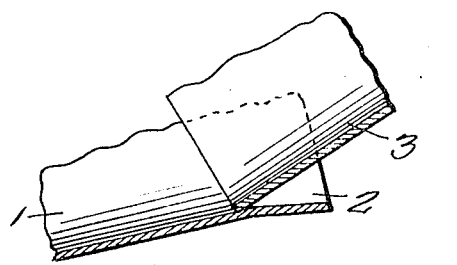

Figure 1 is a side elevation of the device. Fig. 2 is a top plan view. Fig. 3 is a rear elevation. Fig. 4 is a sectional view on line 4—4 of Fig. 2.

Referring to the drawing 1 indicates the shovel which is curved transversely and is provided adjacent its rear edge with a heel 2, which serves to guide the shovel when the machine is in operation.

Fixed to the shovel 1 and inclined upwardly is a plate 3, said plate having bolted to its under surface a transverse strip 4 the rear edge of which terminates in a plurality of downwardly curved spaced fingers 5.

Fixed to the rear corners of the shovel 1 are handles 6, and extending forwardly from the shovel 1 are beams 7, said beams having vertically disposed brackets 8 carried by their forward ends for rotatably supporting the wheels 9, said wheels being for the purpose of engaging the ground so that the machine can conveniently travel across the field, it being of course understood that suitable draft appliances are connected to the beams.

From the foregoing description it will be seen that when the machine is being drawn across the field the shovel will dig the peanuts and owing to the forward movement of the shovel the peanuts and vines will pass over the plate 3 and on to the fingers 5, where the earth which clings to the peanuts and vines will fall through the spaces between the fingers so that the peanuts and vines can be gathered in a clean state for curing.

What is claimed is:—

A peanut digger comprising a shovel, an inclined plate secured to the shovel and extending rearwardly therefrom, a plurality of downwardly curved spaced fingers associated with the rear edge of the plate, said shovel being curved transversely and provided with a heel, beams connected to the forward ends of the shovel and having brackets carried thereby, wheels carried by the brackets, and handles secured to the rear end of the shovel.

In testimony whereof, I affix my signature, in the presence of two witnesses.

WILLIE L. NELSON.

Witnesses:
 LEA KNOX,
 ROY H. SCOTT.

Copies of this patent may be obtained for five cents each, by addressing the "Commissioner of Patents, Washington, D. C."